UNITED STATES PATENT OFFICE.

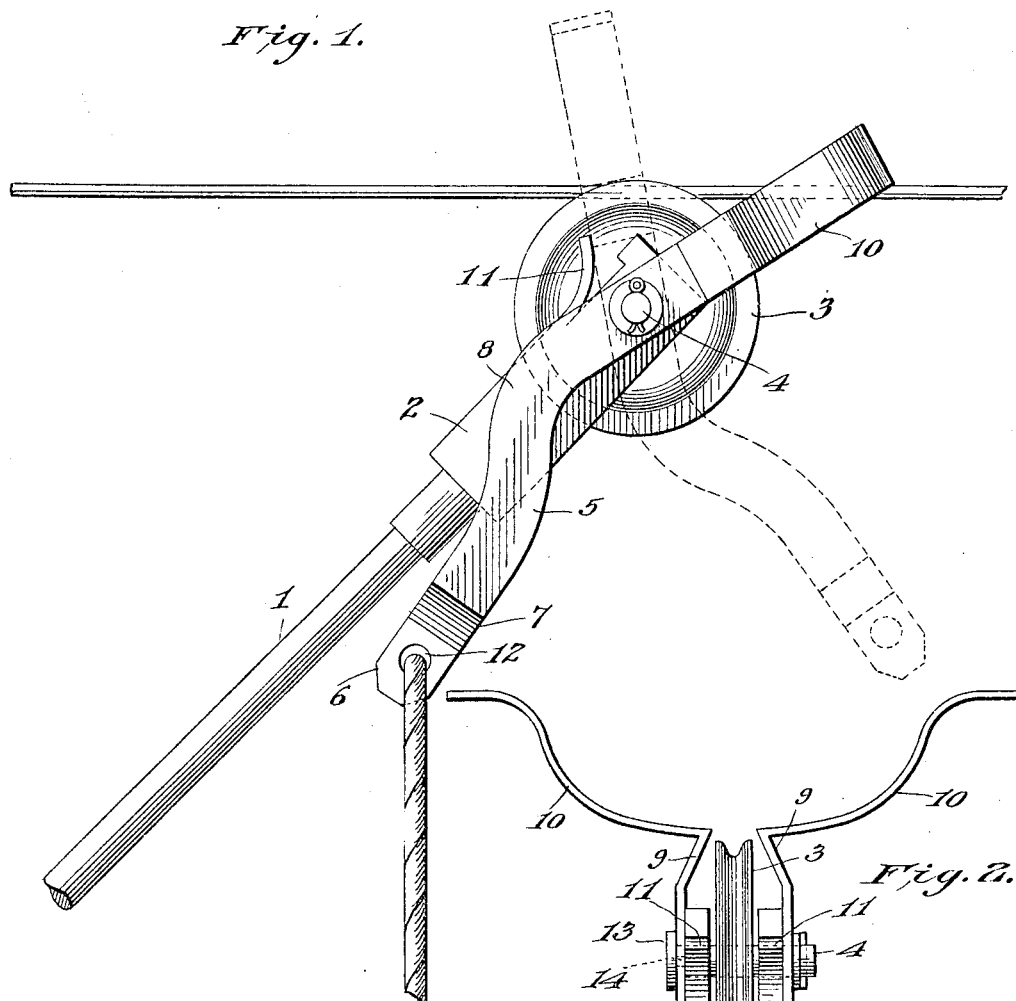
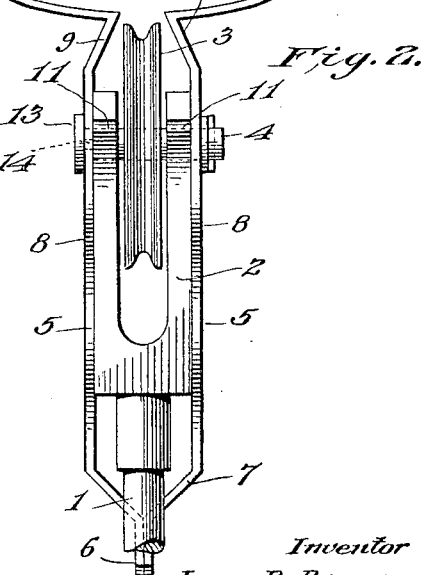

JAMES P. BRENNAN, OF CENTRALIA, PENNSYLVANIA.

TROLLEY-POLE GUIDE.

No. 927,708.  Specification of Letters Patent.  Patented July 13, 1909.

Application filed December 26, 1908. Serial No. 469,269.

*To all whom it may concern:*

Be it known that I, JAMES P. BRENNAN, a citizen of the United States, residing at Centralia, in the county of Columbia and State of Pennsylvania, have invented certain new and useful Improvements in Trolley-Pole Guides, of which the following is a specification.

My invention relates to an improved trolley pole guide, the object of the invention being to provide a trolley pole with an improved guide, fulcrumed between its ends on the trolley wheel journal-pin, and to one end of which the trolley rope is to be secured, the opposite end of the guide providing a wide trolley wire engaging surface to direct the trolley wheel into engagement with the wire.

A further object is to provide improved means for limiting the pivotal movement of the guide, and provide an improved guide of simple, inexpensive construction, strong and durable in use.

With these and other objects in view, the invention consists in certain novel features of construction, and combinations, and arrangement of parts as will be more fully hereinafter described and pointed out in the claims.

In the accompanying drawings, Figure 1, is a view in elevation illustrating my improvements. Fig. 2, is a view in elevation at right angles to Fig. 1, and Fig. 3, is a detail view of the journal pin.

1 represents a trolley pole having a forked end 2, in which a trolley wheel 3 is mounted to rotate upon a journal pin 4, the latter projecting through alined openings in said forked head 2.

My improved guide comprises two members 5—5. These members are bent from strips of sheet metal and are secured together at their lower ends as shown at 6, and are then flared outward from each other as shown at 7, and then extend parallel on opposite sides of the head 2 and are given a general compound curvature as shown at 8. The members 5—5 then project inwardly toward each other and in close proximity to the periphery of the trolley wheel 3 as shown at 9, and are then bowed outwardly from each other and given a general compound curvature, as shown at 10, constituting a wide trolley wire engaging surface, which will direct the wire from either side to the center of the guide, to the trolley wheel 3. The edges of the parallel members of the forked head 2, are slit and bent outward forming stops 11, which latter lie in the path of the inwardly bent portions 9 of the guide, so as to limit the pivotal movement of the guide on the pin 4.

The lower end of the guide where the two members 5—5 are secured together, is provided with an opening 12 to receive the ordinary trolley rope, so as to manipulate the trolley pole to guide the trolley in position, or draw the pole down as the case may be.

The pin 4 is made with a head 13 at one end and a locking pin receiving opening at its other end, and the headed end of the pin 4 is made with a key 14 to enter a key-way in one guide member 5, so as to compel the pin to turn with the guide and prevent rotary movement of the pin when the trolley wheel turns.

In operation, assuming that it is desired to direct the trolley wheel against the trolley wire, the operator, by grasping the trolley rope secured to the lower end of the guide members 5, can swing the pole until the trolley wire engages any portion of the wide surface 10 of the guide when by releasing the pull on the rope, the cam action on the guide against the trolley wire will move the pole to a position with the wire on the trolley wheel. When a downward pull is made on the guide, the latter being fulcrumed at the pin 4, the members of the guide will engage the shoulders 11 to properly position the guide to best engage the trolley wire, and when a pull on the guide is released, the latter will assume a position out of contact with the cross wires supporting the trolley wire, such as is ordinarily in use.

Slight changes might be made in the general form and arrangement of parts described, without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. The combination with a trolley pole, a forked head, of a journal pin located in said head, a trolley wheel mounted on said pin in the forked head, a trolley guide straddling the head and fulcrumed between its ends on said pin, the lower end of said guide adapted for the attachment of a trolley rope, and the upper ends of said guide bent inwardly toward the periphery of the trolley wheel, and then flared outwardly forming guides, and shoulders struck up from the body of the head and against which the inwardly bent portions of said guide are adapted to engage and limit the pivotal movement of the guide.

2. The combination with a trolley pole and a forked head, a journal pin located in said head, a trolley wheel mounted on said pin, a trolley guide, comprising two metal strips located at opposite sides of the head and fulcrumed between their ends on said pin, the lower ends of said strips secured together and provided with a rope receiving opening, the upper ends of said strips bent inwardly toward the periphery of the trolley wheel and then flared outwardly forming guides, shoulders struck up from the body of the head and against which the inwardly bent portions of the said strips are adapted to engage and limit the pivotal movement of the guide, and said pin having a head at one end, securing means at its other end, and a key at the headed end located in a key-way in one of said strips.

In testimony whereof I have signed my name to this specification in the presence of two subscribing witnesses.

JAMES P. BRENNAN.

Witnesses:
M. W. BRENNAN,
WM. J. SCHUMACHER.